United States Patent [19]

Schlatter

[11] 3,883,811

[45] May 13, 1975

[54] DENSITOMETER

[75] Inventor: Gerald Lance Schlatter, Boulder, Colo.

[73] Assignee: International Telephone and Telegraph Corporation, New York, N.Y.

[22] Filed: Aug. 12, 1974

[21] Appl. No.: 496,633

Related U.S. Application Data

[62] Division of Ser. No. 423,409, Dec. 10, 1973.

[52] U.S. Cl. .................................. 328/155; 331/1 A

[51] Int. Cl. ........................................... H03k 5/153

[58] Field of Search ............... 328/155; 331/1 A, 20

[56] References Cited

UNITED STATES PATENTS

| | | | |
|---|---|---|---|
| 2,545,346 | 3/1951 | Edelsohn | 331/20 |
| 2,645,717 | 7/1953 | Massman | 331/20 |

*Primary Examiner*—John Kominski
*Attorney, Agent, or Firm*—A. Donald Stolzy

[57] ABSTRACT

A vibration densitometer including a closed loop electromechanical oscillator for vibrating a fluid immersible vane. A digital output directly proportional to density is achieved through a unique digital squarer. The densitometer is an all digital system. In the loop, a tracking filter is provided. Separate search and track automatic gain control feedbacks are provided. A threshold detector controls clamps and a gate to cause the voltage controlled oscillator of a first phase lock loop to search or track the vane resonant frequency. The threshold detector also effects the search feedback. A phase adjustment circuit and a second phase lock loop are employed to impress a sine wave voltage component on the vane driver of a phase which creates maximum efficiency.

4 Claims, 22 Drawing Figures

DENSITOMETER

BACKGROUND OF THE INVENTION

This is a divisional application of copending application Ser. No. 423,409 filed Dec. 10, 1973. The benefit of the filing date of said copending application is, therefore, hereby claimed.

This invention relates to vibration densitometers, and more particularly, to an improved densitometer and a digital function generator therefor for producing a digital output directly porportional to density.

Vibration densitometers are essential digitally inclined instruments because the density they indicate is a function of their vibrational frequency. However, to the present time, no highly accurate or inaccurate digital linearization circuit has been employed with such instruments.

SUMMARY OF THE INVENTION

In accordance with the present invention, the above-described and other disadvantages of the prior art are overcome by providing a digital function generator for very accurately linearizing the output of the electromechanical oscillator of a vibration densitometer.

Other features of the invention reside in the use of a search or sweep feedback and an automatic gain control (AGC) feedback.

Still another feature of the invention resides in the use of a threshold detector for search, track and feedback control.

A further feature of the invention resides in the use of a phase adjustment circuit and phase lock loop to effect maximum drive efficiency.

The above-described and other advantages of the present invention will be better understood from the following detailed description when considered in connection with the accompanying drawings.

BRIEF DESCRIPTION OF THE DRAWINGS

In the drawings, which are to be regarded as merely illustrative.

DESCRIPTION OF THE PREFERRED EMBODIMENTS

Figure 1:
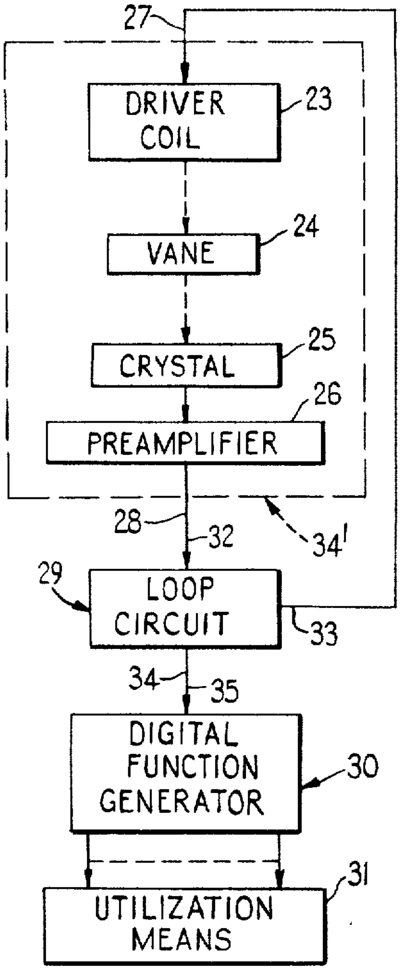
FIG. 1 is a block diagram of a densitometer constructed in accordance with the present invention.

In the drawings, in FIG. 1, a vibration densitometer probe is indicated at 34' having a driver coil 23, a vane 24, a piezoelectric crystal 25 and a preamplifier 26.

Probe 34' has an input lead 27 and an output lead 28.

Other blocks shown in FIG. 1 are a loop circuit 29, a digital function generator 30 and utilization means 31. Loop circuit 29 has an input lead 32 and output leads 33 and 34. Digital function generator 30 has an input lead 35 connected from loop circuit output lead 34. The output of digital function generator 30 is connected to utilization means 31.

The output lead 28 of probe 34' is connected to the input lead 32 of loop circuit 29. The input lead 27 of probe 34' is connected from the output lead 33 of loop circuit 29. Probe 34' and loop circuit 29 form a closed loop electromechanical oscillator. Vane 24 is submerged in a fluid. The density of the fluid is a function of the frequency at which vane 24 vibrates.

Digital function generator 30 may have its input lead 35 connected from lead 33 or at other points in loop circuit 29. Loop circuit 29 impresses a square wave voltage on input lead 35 of digital function generator 30 having a mark-to-space ratio of 1:1.

Utilization means 31 shown in FIG. 1 may be a density indicator, a specific gravity indicator, a process controller or otherwise.

Throughout this description, reference will be made to the text of certain U.S. patents and U.S. patent applications. These patents and patent applications are listed for convenience forthwith.

Reference is hereby made to the following patents:

1. U.S. Pat. No. 3,677,067.
2. U.S. Pat. No. 3,706,220.
3. U.S. Pat. No. 3,738,155.
4. U.S. Pat. No. 3,741,000.

The foregoing patents of paragraphs (1), (2), (3) and (4) are hereinafter referred to as patents P1, P2, P3 and P4, respectively.

Reference is hereby made to the following U.S. patent applications:

1. U.S. patent application Ser. No. 161,025 filed July 9, 1971, for DENSITOMETER COMPONENTS by G. L. Schlatter.

2. U.S. patent application Ser. No. 187,948 filed Oct. 12, 1971, for FLUID SENSING SYSTEMS by G. L. Schlatter-C. E. Miller.
3. U.S. patent application Ser. No. 270,335 filed July 10, 1972, for DENSITOMETER by G. L. Schlatter.
4. U.S. patent application Ser. No. 289,770 filed Sept. 18, 1972, for VIBRATION DENSITOMETER APPARATUS by G. L. Schlatter.
5. U.S. patent application Ser. No. 299,638 filed Oct. 20, 1972, for METHOD OF AND APPARATUS FOR RESOLVING A COMPLEX A.C. VOLTAGE OR CURRENT INTO ITS VECTOR COMPONENTS by N. A. Marshall.
6. U.S. patent application Ser. No. 309,168 filed Nov. 24, 1972, for DENSITOMETER AND PROBE THEREFOR by C. E. Miller.
7. U.S. patent application Ser. No. 309,250 filed Nov. 24, 1972, for FLUID SENSING SYSTEMS by G. L. Schlatter-C. E. Miller.
8. U.S. patent application Ser. No. 318,836 filed Dec. 27, 1972, for FLUID DENSITY DIGITAL COMPUTER by M. H. November.
9. U.S. patent application Ser. No. 321,662 filed Jan. 8, 1973, for PULSE TRAIN MODIFICATION CIRCUIT by P. Z. Kalotay-G. A. Fitzpatrick.
10. U.S. patent application Ser. No. 332,741 filed Feb. 15, 1973, for METHOD OF MAKING A VIBRATION DENSITOMETER by C. E. Miller.

The foregoing U.S. patent applications listed in paragraphs (1)-(10), inclusive, are referred to hereinafter as applications A1-A10, respectively.

Probe 34' shown in FIG. 1 may be conventional. Alternatively, probe 34' may be similar to or identical to a probe shown in any of the patents P1-P4. Probe 34' may also be similar to or identical to the probe shown in applications A2, A6, A7 or A10.

Preamplifier 26 shown in FIG. 1 may be conventional. Preamplifier 26 may also be similar to or identical to either one of the preamplifiers shown in applications A4 or A5.

Figure 2:
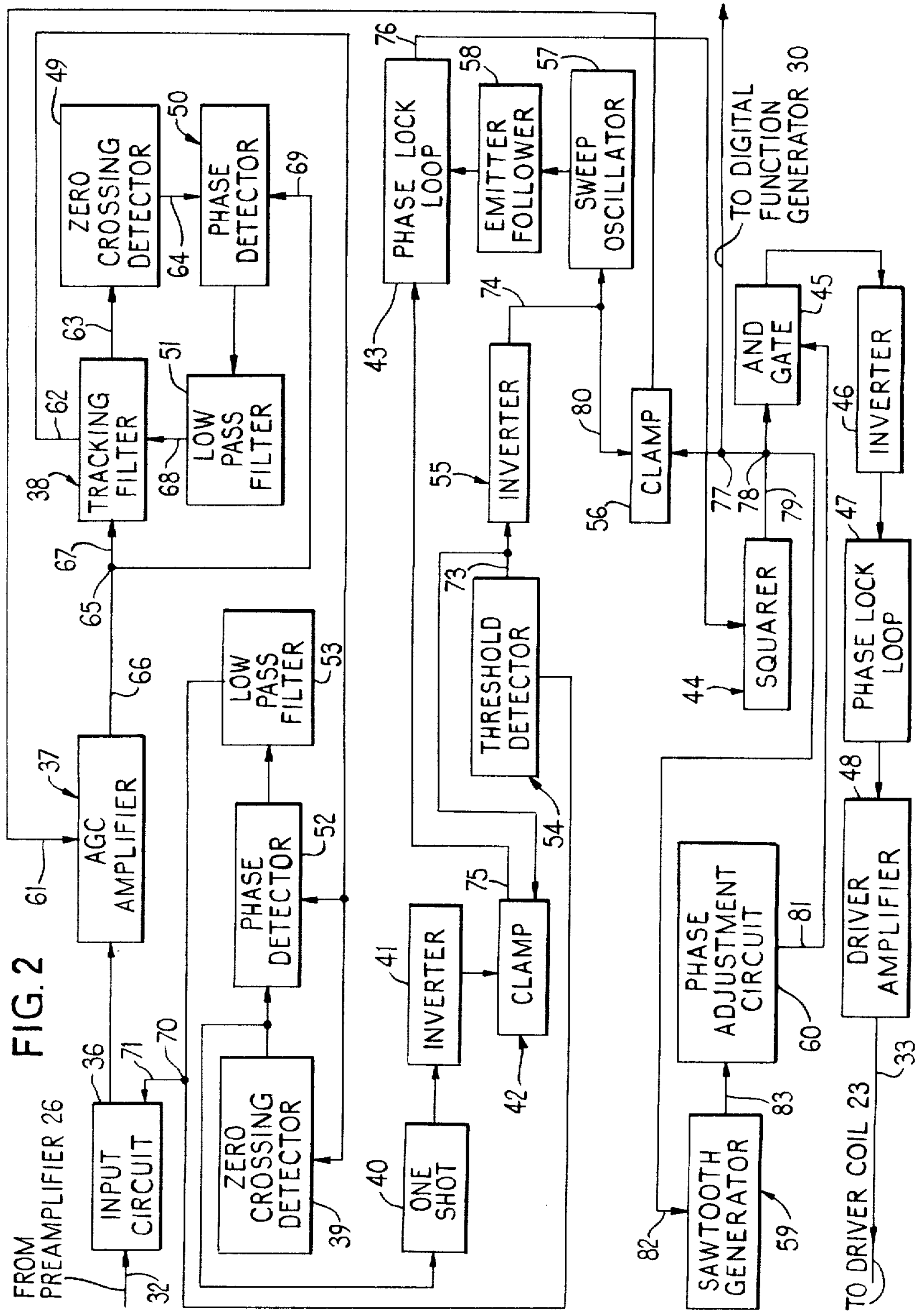
FIG. 2 is a block diagram of a loop circuit shown in FIG. 1.

Loop circuit 29 is shown in FIG. 2 including an input circuit 36, an AGC amplifier 37, a tracking filter 38, a zero crossing detector 39, a one-shot multivibrator 40, an inverter 41, a clamp 42, a phase lock loop 43, a squarer 44, an AND gate 45, an inverter 46, a phase lock loop 47 and a driver amplifier 48 connected in succession as serial stages from input lead 32 of input circuit 29 to its output lead 33 and connected respectively from the output lead 28 of probe 34' and to the input lead 27 of probe 34'.

In FIG. 2, other stages are a zero crossing detector 49, a phase detector 50, a low pass filter 51, a phase detector 52, a low pass filter 53, a threshold detector 54, aninverter 55, a clamp 56, a sweep oscillator 57, an emitter-follower 58, a saw-tooth generator 59 and a phase adjustment circuit 60.

AGC amplifier 37 has an AGC input lead 61 connected from the output of clamp 56.

Tracking filter 38 has two output leads 62 and 63. Tracking filter output lead 63 is connected to the input of zero crossing detector 49. The output of zero crossing detector 49 is connected to one input 64 of phase detector 50. A junction is provided at 65 from which an output lead 66 of AGC amplifier 37 is connected. Tracking filter 38 has two input leads 67 and 68. Tracking filter input lead 67 is connected from junction 65.

Phase detector 50 has a second input lead 69 connected from junction 65. The output of phase detector 50 is connected to the input of low pass filter 51. The output of low pass filter 51 is connected to the input lead 68 of tracking filter 38.

The purpose of zero crossing detector 59, phase detector 50 and low pass filter 51 is to cause tracking filter 38 to track the frequency of output signal of AGC amplifier 37. The signal on the tracking filter 68, thus, causes the passband thereof to straddle the frequency of the input to tracking filter 38 over input lead 67.

The output of tracking filter 38 on output lead 62 thereof is 90° out of phase with the signal on the output lead 63 thereof. The signal from the tracking filter output lead 62 is impressed upon zero crossing detector 39 and phase detector 52. The output of zero crossing detector 39 is impressed both upon phase detector 52 and one-shot 40. The output of phase detector 52 is impressed upon low pass filter 53.

A junction is provided at 70 connected from the output of low pass filter 53. A lead 71 is connected from junction 70 to input circuit 36 to the AGC input of an amplifier therein for automatic gain control.

Threshold detector 54 has an input 72 connected from junction 70. Input lead 72 of threshold detector 54, when below a predetermined potential, causes the potential of the output lead 73 of threshold detector 54 to go either high or low. The output lead 73 of threshold detector 54 is, thus, for example, either ground or + 15 volts or + V1, as defined hereinafter. When the output of low pass filter 53 is below the predetermined potential, output lead 73 of threshold detector 54 is at ground.

Threshold detector 54 operates both of the clamps 42 and 56 and the sweep oscillator 57. Clamp 56 and sweep oscillator 57 are operated through the inverter 55.

Inverter 55 has an output lead 74 which also assumes potentials of V1 or ground.

Clamp 42 either passes the output of inverter 41 to the phase lock loop 43 or in the other state of the threshold detector 54, clamp 42 having an output lead 75, is operated to clamp the output lead 75 to ground. The output of inverter 55 is simply the reverse of the output detector 54. When the output of inverter 55 is high, sweep oscillator 57 receives power. When the output of inverter 55 is low, the output of sweep oscillator 57 is at ground.

Emitter follower 58 is connected between sweep oscillator 57 and phase lock loop 43. Phase lock loop 43 has an output lead 76 which is connected to squarer 44. Junctions are provided at 77 and 78. Squarer 44 has an output lead 79 connected to junction 78. Junction 78 is connected to junction 77. Clamp 56 is connected from junction 77 to AGC amplifier input lead 61.

When the output of threshold detector 54 is high, loop circuit 29 is tracking and opens clamp 42 to unground the output lead 75 thereof. Conversely, at the same time, inverter 55 grounds the input to sweep oscillator 57 and disables it. During tracking, inverter 55 also disables the output of clamp 56 by a connection 80 from inverter output lead 74 to clamp 56.

During searching, threshold detector 54 holds the output of clamp 42 at ground while inverter 55 operates sweep oscillator 57 and clamp 56 passes the output of squarer 44 to the AGC input lead 61 of AGC amplifier 37.

In FIG. 2, junction 77 is connected to digital function generator 30 shown in FIG. 1.

AND gate 45 receives an input from junction 78 and from an output lead 81 of phase adjustment circuit 60.

Saw-tooth generator 59 has an input lead 82 connected from junction 78, and an output lead 83 connected to an input of phase adjustment circuit 60.

Circuit 60 is manually adjustable to manually adjust the sine wave component of the output voltage of driver amplifier 48 through the use of certain structures including the phase adjustment circuit 60, itself, and phase lock loop 47. This adjustment makes the electromechanical oscillator oscillate with maximum efficiency.

OPERATION

In the embodiment of the invention shown in FIG. 1, probe 34' and loop circuit 29 provide an electromechanical oscillator which oscillates at a frequency dependent upon the density of the fluid in which vane 24 is immersed. The same is true of the pulse repetition frequency of the square wave voltage applied to the input lead 35 of digital function generator 30.

Digital function generator 30 may be described as a digital linearization circuit. It produces a digital output directly proportional to density from the input signal thereto impressed upon the input lead 35 thereto.

Figure 3:
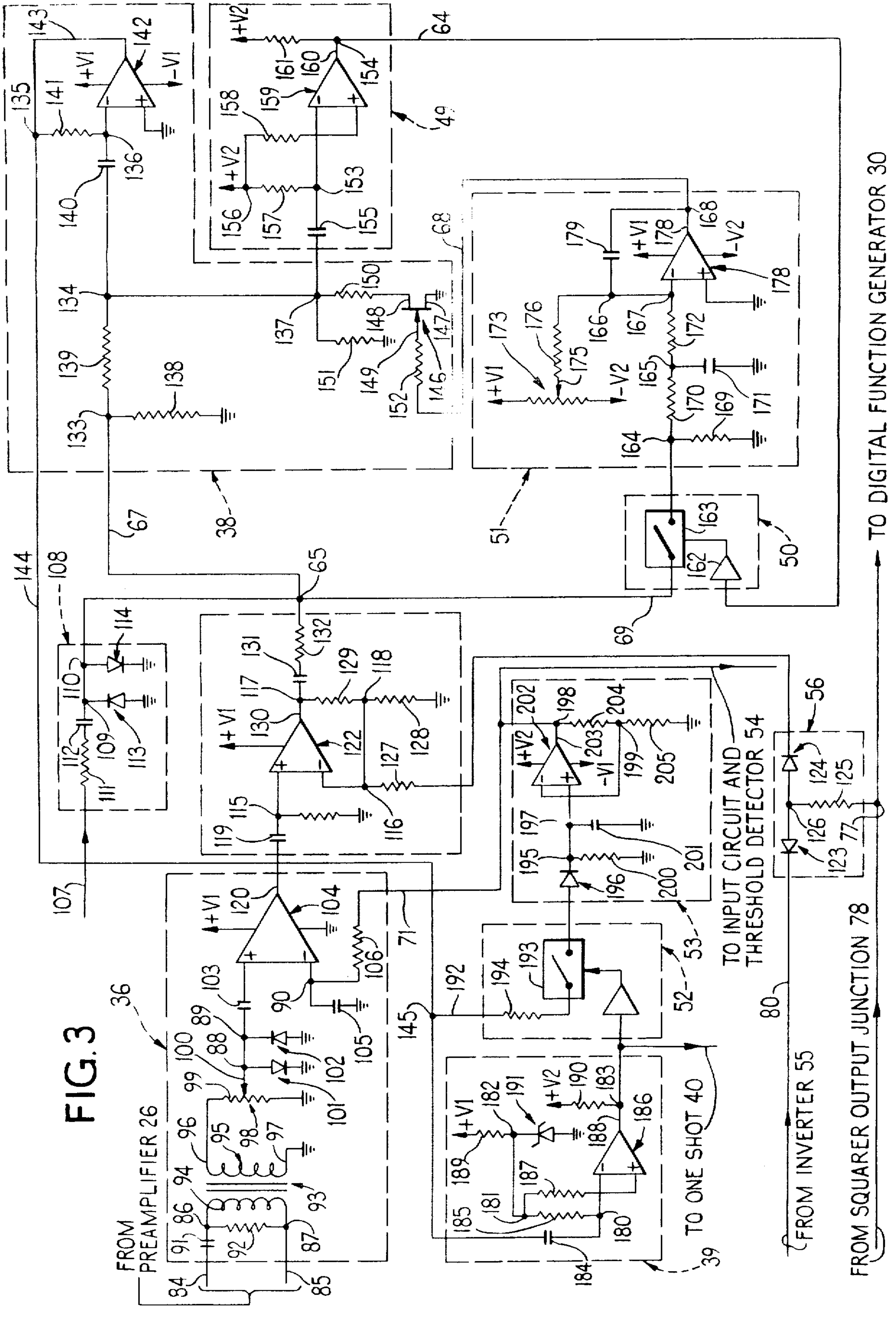
FIG. 3 is a schematic diagram of an input circuit, an AGC amplifier, a tracking filter, two zero crossing detectors, two phase detectors, two low pass filters and a clamp shown in FIG. 2.

In FIG. 3, input circuit 36 is shown for connection from preamplifier 26 in FIG. 1. Input circuit 36 has input leads 84 and 85. Input circuit 36 has various junctions 86, 87, 88, 89 and 90. A capacitor 91 is connected from input lead 84 to junction 86. Input lead 85 is connected to junction 87. A resistor 92 is connected between junctions 86 and 87. A transformer 93 is provided with a primary winding 94 and a secondary winding 95. Primary winding 94 is connected between junctions 86 and 87. Secondary winding 95 has leads 96 and 97, lead 97 being grounded. A potentiometer 98 is provided having a winding 99 and a wiper 100. Winding 99 is connected from transformer secondary lead 96 to ground. Wiper 100 is connected to junction 88. A diode 101 is connected from junction 88 to ground and poled to be conductive in a direction toward ground. A diode 102 is connected from junction 89 to ground and poled in a direction to be conductive toward junction 89. Junctions 88 and 89 are connected together.

A capacitor 103 is connected from junction 89 to the non-inverting input of a differential amplifier 104. Junction 90 is connected from the inverting input of amplifier 104. A capacitor 105 is connected from junction 90 to ground. A resistor 106 is connected from junction 70 to junction 90.

All of the blocks shown in FIG. 2 may be entirely conventional except phase lock loop 43 and phase adjustment circuit 60.

In FIG. 3, a calibration frequency may be provided over input lead 107, if desired, and impressed upon junction 65 through a circuit 108. Circuit 108 includes junctions 109 and 110. A resistor 111 and a capacitor 112 are connected in series in that order from lead 107 to junction 109. A diode 113 is connected from ground to junction 109, and is poled to be conductive in a direction toward junction 109. A diode 114 is connected from junction 110 to ground and is poled to be conductive in a direction toward ground. Junctions 109 and 110 are connected together. Junctions 110 and 65 are also connected together.

AGC amplifier 37 has junctions 115, 116, 117 and 118. A capacitor 119 is connected from an output lead 120 of amplifier 104 in input circuit 36 to junction 115. A resistor 121 is connected from junction 115 to ground. Junction 115 is also connected to the non-inverting input of an amplifier 122.

Clamp 56 includes diodes 123 and 124, and a resistor 125. Diodes 123 and 124 are connected in succession in that order from lead 80 to lead 61.

A junction is shown at 126. The anodes of diodes 123 and 124 are connected to junction 126. The cathode of diode 123 is connected to lead 80. The cathode of diode 124 is connected to lead 61.

Junction 77 is connected from junction 78, as described previously.

In FIG. 3, in AGC amplifier 37, a resistor 129 is connected from lead 61 to junction 116. Junctions 116 and 118 are connected together. A resistor 128 is connected from junction 118 to ground. A resistor 129 is connected between junctions 117 and 118. Amplifier 122 has an output lead 130 connected to junction 117. A capacitor 131 and a resistor 132 are connected in series in that order from junction 117 to junction 65.

Again, in FIG. 3, junctions are provided at 133, 134, 135, 136 and 137. Junction 133 is connected from lead 67. A resistor 138 is connected from junction 133 to ground. A resistor 139 is connected between junctions 133 and 134. A capacitor 140 is connected between junctions 134 and 136. A resistor 141 is connected between junctions 135 and 136. A differential amplifier 142 is provided having an inverting input connected from junction 136, a grounded non-inverting input, and an output lead 143 connected to junction 135.

Tracking filter 38 is connected to zero crossing detector 39 and phase detector 52 via a lead 144 connected from junction 135 in tracking filter 38 to a junction 145. Zero crossing detector 39 and phase detector 52 are connected from junction 145. In FIG. 3, tracking filter 38 has a field effect transistor 146 including a source 147, a drain 148 and a gate 149. Source 147 is grounded. A resistor 150 is connected from drain 148 to junction 137. Junctions 134 and 137 are connected together. A resistor 151 is connected from junction 137 to ground. A resistor 152 is connected from gate 149 to lead 68.

Zero crossing detector 49 has junctions at 153 and 154. A capacitor 155 is connected from junction 137 to junction 153. A third junction 156 is also provided and maintained at potential +V2. A resistor 157 is connected between junctions 153 and 156. A resistor 158 is connected from junction 156 to the non-inverting input lead of a differential amplifier 159. Junction 153 is connected to the inverting input lead of amplifier 159. Amplifier 159 has an output lead 160 connected to junction 154. A resistor 161 is connected from junction 154 to potential +V2.

Lead 64 connects junction 154 to the input of a conventional amplifier 162 in phase detector 50. Phase detector 50 also includes a conventional electronic or transistor switch 163 which is connected from and operated by amplifier 162. Switch 163 is connected by a lead 69 from junction 65 to low pass filter 51 at junction 164 therein. Low pass filter 51 has various other junctions 165, 166, 167 and 168. A resistor 169 is connected from junction 164 to ground. A resistor 170 is connected between junctions 164 and 165. A capacitor 171 is connected from junction 165 to ground. A resistor 172 is connected between junctions 165 and 167. Junctions 166 and 167 are connected together. A potentiometer is provided at 173 having a winding 174 and a wiper 175. Winding 174 is connected between +V1 and −V1. A resistor 176 is connected from wiper 175 to junction 166. A differential amplifier 171 is provided having an output lead 178 connected to junction 168. A capacitor 179 is connected between junctions 166 and 168. Junction 167 is connected to the inverting input lead of amplifier 177. The non-inverting input lead of amplifier 177 is connected to ground. Lead 68 and resistor 152 are connected in series in that order from junction 168 to gate 149 of field effect transistor 146.

Zero crossing detector 39 includes four junctions 180, 181, 182 and 183. A capacitor 184 is connected from junction 145 to junction 180. A resistor 185 is connected between junctions 180 and 181. An amplifier is provided at 186. A resistor 187 is connected from junction 181 to the non-inverting input of amplifier 186. Junction 180 is connected to the inverting input of amplifier 186. Amplifier 186 has an output lead 188 connected to junction 183. Junctions 181 and 182 are connected together. A resistor 189 is connected from junction 182 to potential +V1. A resistor 190 is connected from junction 183 to potential +V2. A zener diode 191 is connected from junction 182 to ground and is poled to be back biased between potential +V1.

Phase detector 52 may be identical to phase detector 50 and, therefore, will not be described except that phase detector 52 has an input lead 192 connected from junction 145 to a switch 193 via a resistor 194. Switch 193 is connected to low pass filter 53 to a junction 195 via a diode 196 poled to be conductive toward junction 195. Low pass filter 53 also has junctions 197, 198 and 199. A resistor 200 is connected from junction 195 to ground. A capacitor 201 is connected from junction 197 to ground. Junctions 195 and 197 are connected together. A differential amplifier 201 has an output lead 203 connected to junction 198. Junction 197 is connected to the non-inverting input of amplifier 202. The inverting input of amplifier 202 is connected from junction 199. Junctions 198 and 70 are connected together. A resistor 204 is connected between junctions 198 and 199. A resistor 205' is connected from junction 199 to ground.

Figure 4:
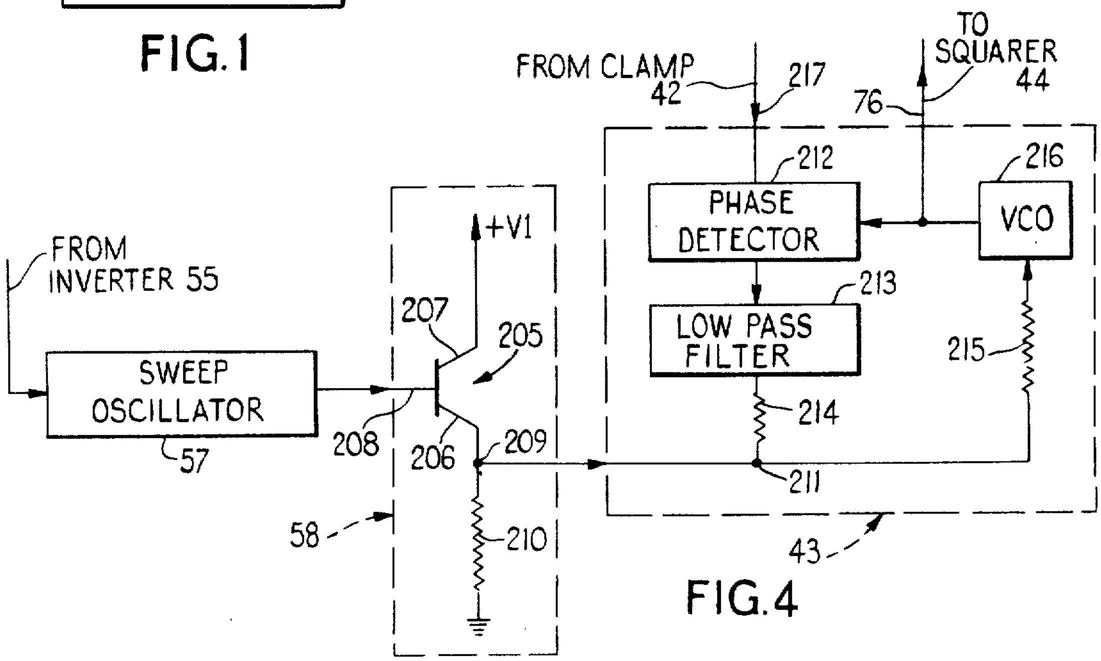
FIG. 4 is a block diagram of a phase lock loop shown in FIG. 2.

In FIG. 4, sweep oscillator 57 is again shown with emitter-follower 58 and phase lock loop 43. Emitter-follower 58 includes a transistor 205 having an emitter 206 connected from the output of sweep oscillator 57, a collector 207 and a base 208. Collector 207 is connected to potential V1. Emitter-follower 58 has a junction 209 connected from emitter 206. A resistor 210 is connected from junction 209 to ground.

Junction 209 is connected to a junction 211 in phase lock loop 43. Phase lock loop 43 includes a phase detector 212, a low pass filter 213, a resistor 214, a resistor 215 and a voltage controlled oscillator (VCO) 216.

VCO 216 may or may not produce a saw-tooth output voltage and may or may not be conventional in each case. If the output voltage of VCO 16 is a saw-tooth, squarer 44 and saw-tooth generator 59 in FIG. 2 may be omitted and lead 76 connected directly to junction 78 and connected directly to the input of phase adjustment circuit 60.

Phase lock loop 43 has an input lead 217 connected from clamp output lead 75 shown in FIG. 2, and the output lead 76 connected to the input of squarer 44.

Phase detector 212 has an input connected from lead 217 and a second input connected from the output of VCO 216 which is also connected to lead 76. During tracking, the output of phase detector 212 is impressed upon the input of VCO 216 via a low pass filter 213, resistor 214 and resistor 215 in succession in that order, resistor 214 being connected from the output of low pass filter 213 to junction 211. Resistor 215 is connected from junction 211 to the input of VCO 216.

During tracking, transistor 205 of emitter-follower 58 is cut off and the output of sweep oscillator 57 is grounded because of the grounded output of inverter 55.

During searching, lead 217 is grounded by clamp 42. The output of low pass filter 213 is then grounded. Transistor 205 is no longer cut off and the output of sweep oscillator 57 passes to VCO 216 via emitter-follower 58.

Figures 5, 7, 8:
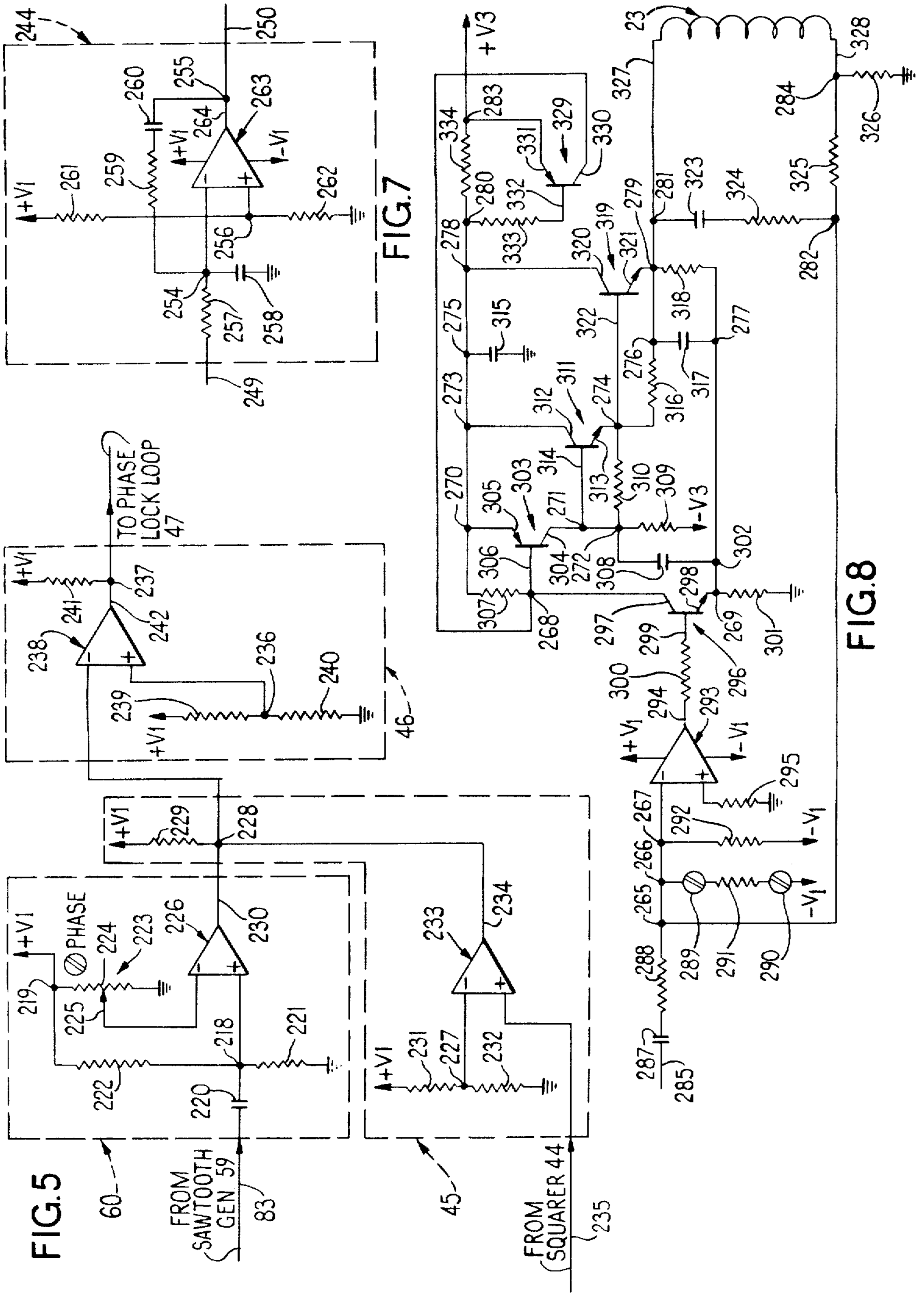
FIG. 5 is a schematic diagram of a phase adjustment circuit, an AND gate and an inverter shown in FIG. 2.
FIG. 7 is a schematic diagram of a low pass filter shown in FIG. 6.
FIG. 8 is a schematic diagram of a driver amplifier shown in FIG. 2.

In FIG. 5, phase adjustment circuit 60 is shown connected from saw-tooth generator 59 over lead 83. Phase adjustment circuit 60 has two junctions 218 and 219. A capacitor 220 is connected from lead 83 to junction 218. A resistor 221 is connected from junction 218 to ground. A resistor 222 is connected between junctions 218 and 219. Junction 219 is maintained at potential +V1. A potentiometer 223 is shown having a winding 224 and a wiper 225. Winding 224 is connected between junction 219 and ground. Wiper 225 is connected to the inverting input of differential amplifier 226. The non-inverting input of amplifier 226 is connected from junction 218.

In FIG. 5, AND gate 45 has junctions 227 and 228. A resistor 229 is connected from potential +V1 to junction 228. In phase adjustment circuit 60, amplifier 226 has an output lead 230 connected to junction 228.

In AND gate 45, a resistor 231 is connected from junction 227 to potential +V1. A resistor 232 is connected from junction 227 to ground. AND gate 45 has a differential amplifier 233 with an output lead 234 connected to junction 228. Amplifier 233 has an inverting input connected from junction 227, and a non-inverting input connected from squarer junction 78 over a lead 235.

Inverter 46 has junctions 236 and 237. Inverter 46 also includes a differential amplifier 238 having an inverting input lead connected from AND gate junction 228 and a non-inverting input lead connected from junction 236. A resistor 239 is connected from junction 236 to potential +V1. A resistor 240 is connected from junction 236 to ground. A resistor 241 is connected from junction 237 to potential +V1. Amplifier 238 has an output lead 242 connected to junction 237. Junction 237 is connected to the input of phase lock loop 47.

Figure 6:
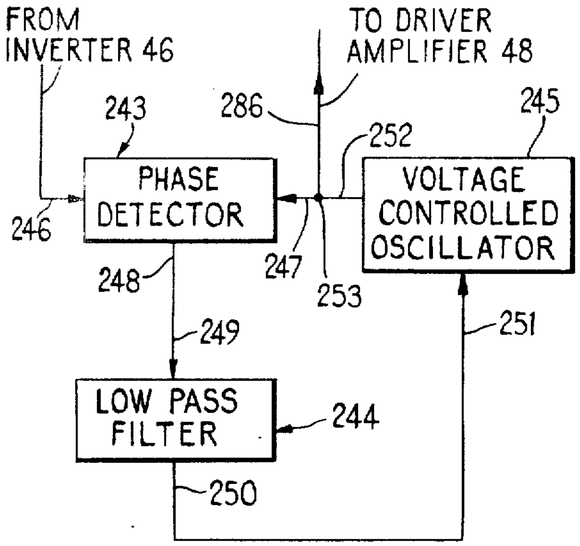
FIG. 6 is a block diagram of another phase lock loop shown in FIG. 2.

Phase lock loop 47 may or may not be entirely conventional, as desired. Phase lock loop 47 is shown in FIG. 6 including a phase detector 243, a low pass filter 244 and a VCO 245. Phase detector 243 has input leads 246 and 247, and an output lead 248. Low pass filter 244 has an input lead 249, and an output lead 250. VCO 245 has an input lead 251 and an output lead 252.

Phase detector input lead 246 is connected from the output lead of inverter 46 at junction 237 shown in FIG. 5. In FIG. 6, the output lead 248 of phase detector 243 is connected to the input lead 249 of low pass filter 244. The output lead 250 of low pass filter 244 is connected to the input lead of VCO 245 at 251.

Both leads 252 and 247 are connected to a common junction 253. Junction 253 is connected to the input of driver amplifier 248.

Low pass filter 244 may be entirely conventional. Alternatively, low pass filter 244 may be that shown in FIG. 7.

VCO 245 is entirely conventional and may or may not produce a sine wave output, as desired.

In FIG. 7, the input and output leads 249 and 250, respectively, of low pass filter 244 are again shown. Low pass filter 244 has three junctions 254, 255 and 256. A resistor 257 is connected between lead 249 and junction 254. A capacitor 258 is connected from junction 254 and ground. A resistor 259 and a capacitor 260 are connected in series in that order from junction 254 to junction 255. A resistor 261 is connected from junction 256 to potential +V1.

A resistor 262 is connected from junction 256 to ground. A differential amplifier 263 is provided with an output lead 264 which is connected to junction 255. The inverting input of amplifier 263 is connected from junction 254. The non-inverting input of amplifier 263 is connected from junction 256. Lead 250 is connected from junction 255.

Driver amplifier 48 of FIG. 2 is also shown in FIG. 8. In FIG. 8, various junctions are illustrated at 265, 266, 267, 268, 269, 270, 271, 272, 273, 274, 275, 276, 277, 278, 279, 280, 281, 282, 283 and 284.

Driver amplifier 48 has an input lead 285 connected from the output lead of phase lock loop 47 shown in FIG. 2. The output lead of phase lock loop 47 is illustrated at 286 in FIG. 6.

In FIG. 8, a capacitor 287 and a resistor 288 are connected in series in that order from lead 285 to junction 265.

Symbols at 289 and 290 indicate that a resistor 291 may be replaced between junction 266 and potential −V1. A resistor 292 is connected between junction 267 and potential −V1. Junctions 265, 266 and 267 are connected together. A differential amplifier 293 is provided with an output lead 294. Amplifier 293 has an inverting input lead connected from junction 267. A resistor 295 is connected from the non-inverting input lead of amplifier 293 to ground. A transistor 296 is provided having a collector 297, an emitter 298 and a base 299. A resistor 300 is connected from amplifier output lead 294 to base 299. Emitter 298 is connected to junction 299. A resistor 301 is connected from junction 269 to ground. A junction 302 is connected from junction 269. Junction 277 is connected from junction 302.

Collector 297 is connected to junction 268. A transistor is provided at 303 having a collector 304, an emitter 305 and a base 306. Base 306 is connected to junction 268. Emitter 305 is connected to junction 270. Collector 304 is connected to junction 271. Junctions 271 and 272 are connected together. A resistor 307 is connected between junctions 268 and 270. A capacitor 308 is connected between junctions 272 and 302. A resistor 309 is connected from junction 272 to potential −V3. A resistor 310 is connected between junctions 272 and 274. A transistor 311 is illustrated having a collector 312, an emitter 313 and a base 314. Base 314 is connected from junction 271. Collector 312 is connected to junction 273. Emitter 313 is connected to junction 274. Junctions 270, 273, 275, 278 and 280 are all connected together.

A transistor 319 is provided having a collector 320, an emitter 321 and a base 322. Base 322 is connected from junction 274. Collector 320 is connected to junction 278. Emitter 321 is connected to junction 279. A capacitor 323 and a resistor 324 are connected in series in that order from junction 281 to junction 282. A resistor 325 is connected between junctions 282 and 284. A resistor 326 is connected from junction 284 to ground.

As shown in FIG. 8, driver coil 23 has leads 327 and 328 connected from junctions 281 and 284, respectively.

A transistor 329 15 provided in FIG. 8 including a collector 330, an emitter 331 and a base 332. A resistor 333 is connected from junction 280 to base 332. A resistor 334 is connected between junctions 280 and 283. Emitter 331 is connected to junction 283. Collector 330 is connected to junction 268. Junction 282 is connected to junction 265.

Figure 9:
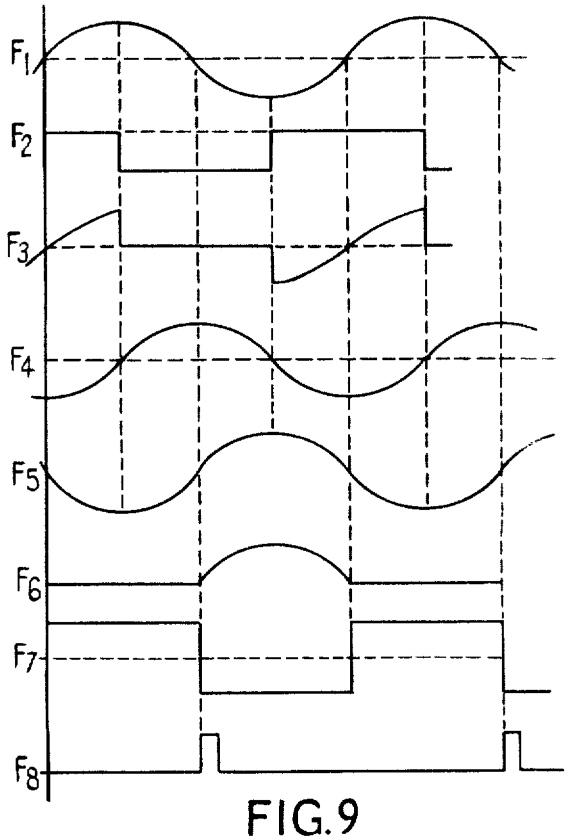
FIGS. 9, 10, 11, 12 and 13 are graphs of a group of waveforms characteristic of the operation of the loop circuit shown in FIGS. 1–8, inclusive.

In FIG. 9, waveforms are illustrated at $F_1$ to $F_8$. The signal at $F_1$ appears at the output of preamplifier 26 shown in FIG. 1 and may vary from 50 to 2,000 millivolts, peak-to-peak.

The output signal of zero crossing detector 49 in FIG. 2 may be as illustrated at $F_2$ in FIG. 9.

Waveform $F_3$ in FIG. 9 may be the output signal of phase detector 50 shown in FIG. 2.

The output signal of tracking filter 38 appearing on output lead 63 thereof shown in FIG. 2 may be as illustrated at $F_4$ in FIG. 9.

The output signal of tracking filter 38 on output lead 62 thereof shown in FIG. 2 may be as illustrated at $F_5$ in FIG. 9.

The output signal of phase detector 52 shown in FIG. 2 may be as illustrated at $F_6$ in FIG. 9.

The output signal of zero crossing detector 39 may be as indicated at $F_7$ in FIG. 9.

The output signal of one-shot 40 shown in FIG. 2 may be as indicated at $F_8$ in FIG. 9.

Figure 10:
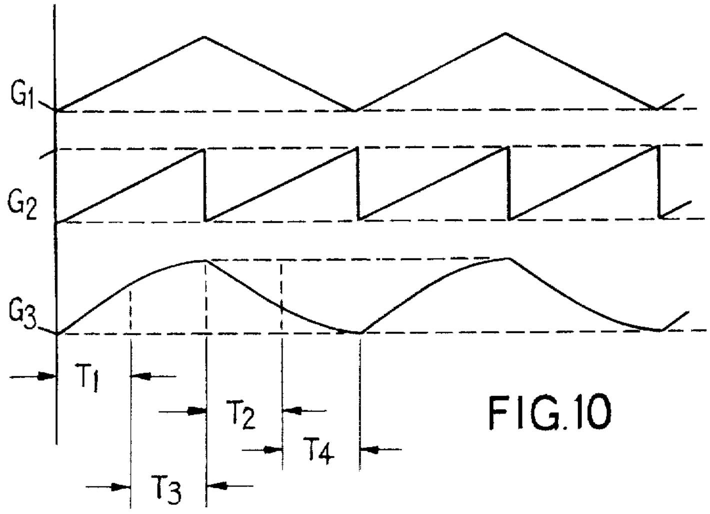

The output signal of sweep oscillator 57 shown in FIG. 2 may alternatively be any one of the waveforms $G_1$, $G_2$ and $G_3$ shown in FIG. 10. Sweep oscillators for the purpose of providing the waveforms $G_1$, $G_2$ and $G_3$ are entirely conventional. Waveform $G_1$ is a triangular waveform. Waveform $G_2$ is a saw-tooth waveform.

The waveform $G_3$ is fairly linear during periods $T_1$ and $T_2$ and fairly curvilinear during periods $T_3$ and $T_4$. The waveform $G_3$ is produced by an RC (resistance-capacitance) circuit.

Figure 11:
Figure 12:
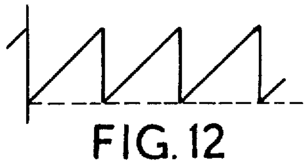

The output lead 79 of saw-tooth generator 59 in FIG. 2 may have a signal thereon as illustrated in FIG. 11. The waveform of FIG. 12 is alternative to that shown in FIG. 11. Saw-tooth generator 59 and squarer 44 may be entirely conventional. Alternatively, saw-tooth generator 59 may produce the waveform of FIG. 12 inverted or not by an inverter to the waveform shown in FIG. 11.

Figure 13:
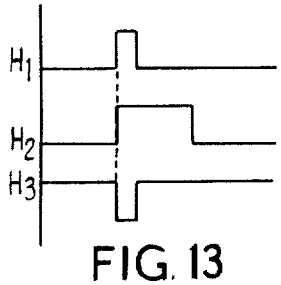

In FIG. 5, amplifier 226 may produce an output pulse as indicated at $H_1$ in FIG. 13 when the potential of junction 218 reaches the potential of wiper 225 of potentiometer 223 (assume FIG. 11 waveform).

In FIG. 13, $H_2$ is the output pulse on output lead 234 of amplifier 233. In FIG. 13, $H_3$ is the output pulse which appears at junction 237 in inverter 46 shown in FIG. 5.

Figures 14, 15, 17:
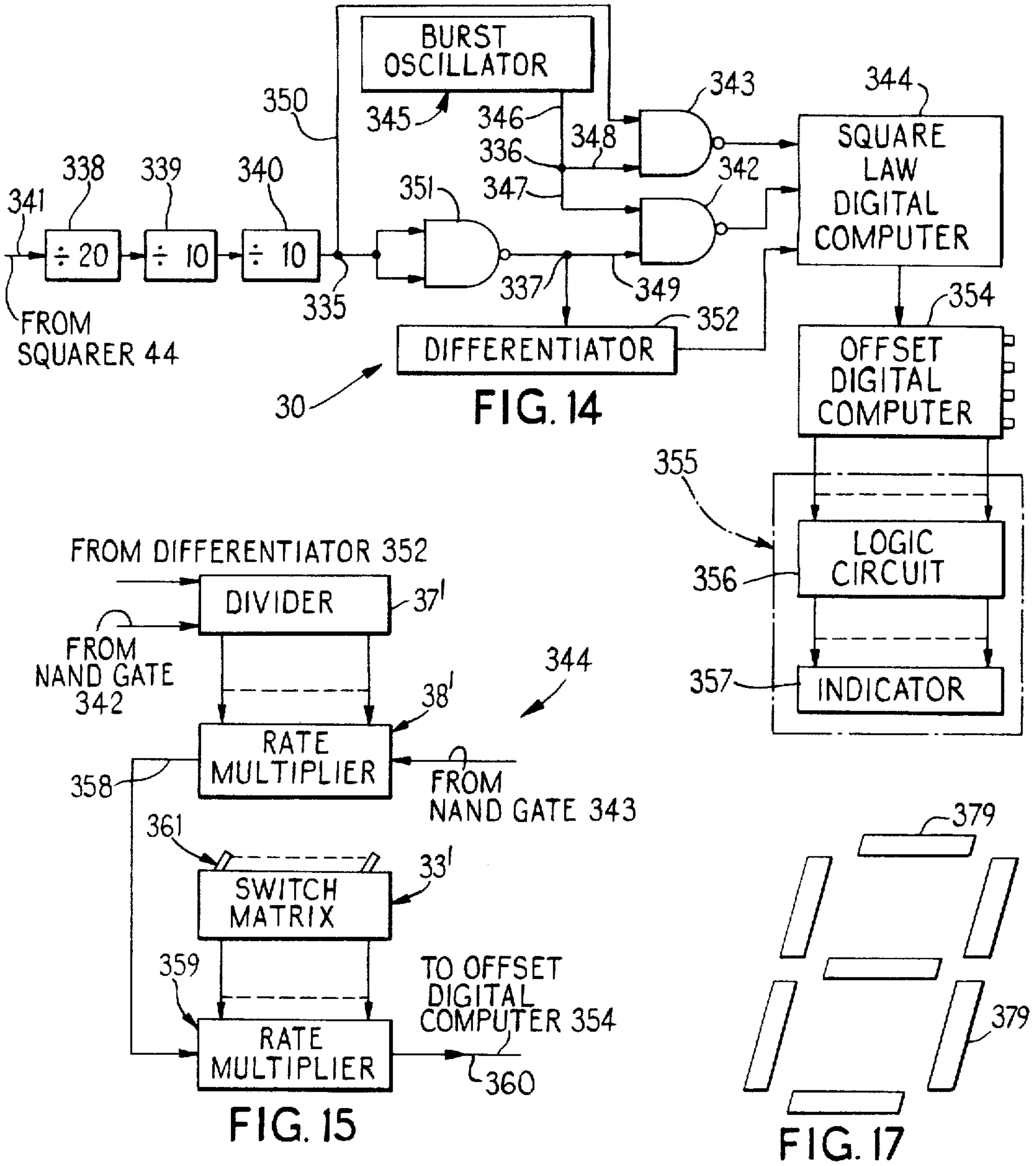
FIG. 14 is a more detailed block diagram of the digital function generator shown in FIG. 11.
FIG. 15 is a more detailed block diagram of a square low digital computer shown in FIG. 14.
FIG. 17 is a front elevational view of a set of lamps conventionally used to, when gated on at appropriate intervals, display selectively one of the 10 digits 1–9 and 0.

One embodiment of the digital function generator 30 is illustrated in FIG. 14. In FIG. 14, junctions are provided at 335, 336 and 337.

Herein, junction 335 may be described as a "terminal junction." Junction 78 in FIG. 2, and other junctions therein, may be described as an "output junction."

In FIG. 14, a divide-by-twenty divider 338, a divide-by-ten divider 339 and a divide-by-ten divider 340 are connected seriatim for an input lead 341 of digital function generator 30 to junction 335. NAND gates are provided at 342 and 343. The output of NAND gates 342 and 343 are impressed upon a square law digital computer 344. A burst oscillator 345 having an output lead 346 connected to junction 336 provides one input to each of the NAND gates 342 and 343 over leads 347 and 348, respectively. Each of the NAND gates 342 and 343 has two inputs. The other input to NAND gate 343 is supplied over a lead 349 connected from junction 337. The other input to NAND gate 343 is connected over a lead 350 from junction 335. An inverter 351 is connected from junction 335 to junction 337. A differentiator 352 is connected from junction 337 to square law digital computer 344. If desired, all of the differentiators disclosed herein may or may not be identical to differentiator 353 shown in FIG. 18. However, other differentiators may also be employed.

An off-set digital computer 354 and a display unit 355 are connected in succession in that order from square law digital computer 344. Off-set digital computer 354 may be entirely conventional or as disclosed in application A8 or as disclosed herein.

Off-set digital computer 354 receives serial groups of serial pulses, the number of pulses in each group being directly proportional to the square of the period of the square wave appearing at terminal junction 335. This is likewise directly proportional to the period of the square wave appearing on input lead 341 of digital function generator 30 shown in FIG. 14.

The number of output pulses in a group impressed upon off-set digital computer 354 may be described as being either equal to or directly proportional to $AT^2$ where T is the period into divider 338. Off-set digital computer 354 then takes a group of these pulses and produces an output continually updated either equal to or directly proportional to $$AT^2 + B.$$

In the above, A and B are constants.

Display unit 335 is entirely conventional. A different display unit may be employed, if desired. Display unit 355 includes a logic circuit 356 connected from off-set digital computer 354, and an indicator 357 connected from the output of logic circuit 356. Indicator 357 can read in binary or decimal numbers directly the density of the fluid in which vane 24 shown in FIG. 1 is immersed. Alternatively, indicator 357 may read in specific gravity or otherwise.

Square law digital computer 344 is illustrated in FIG. 15. Square law digital computer 344 shown in FIG. 15 has a divider 37' which is merely a counter that counts the output pulses from NAND gate 342. Differentiator 352 sets the count of divider 37' to zero upon the leading edge of the pulse appearing at junction 337 and shown at E6 in FIG. 21.

Figures 21, 22:
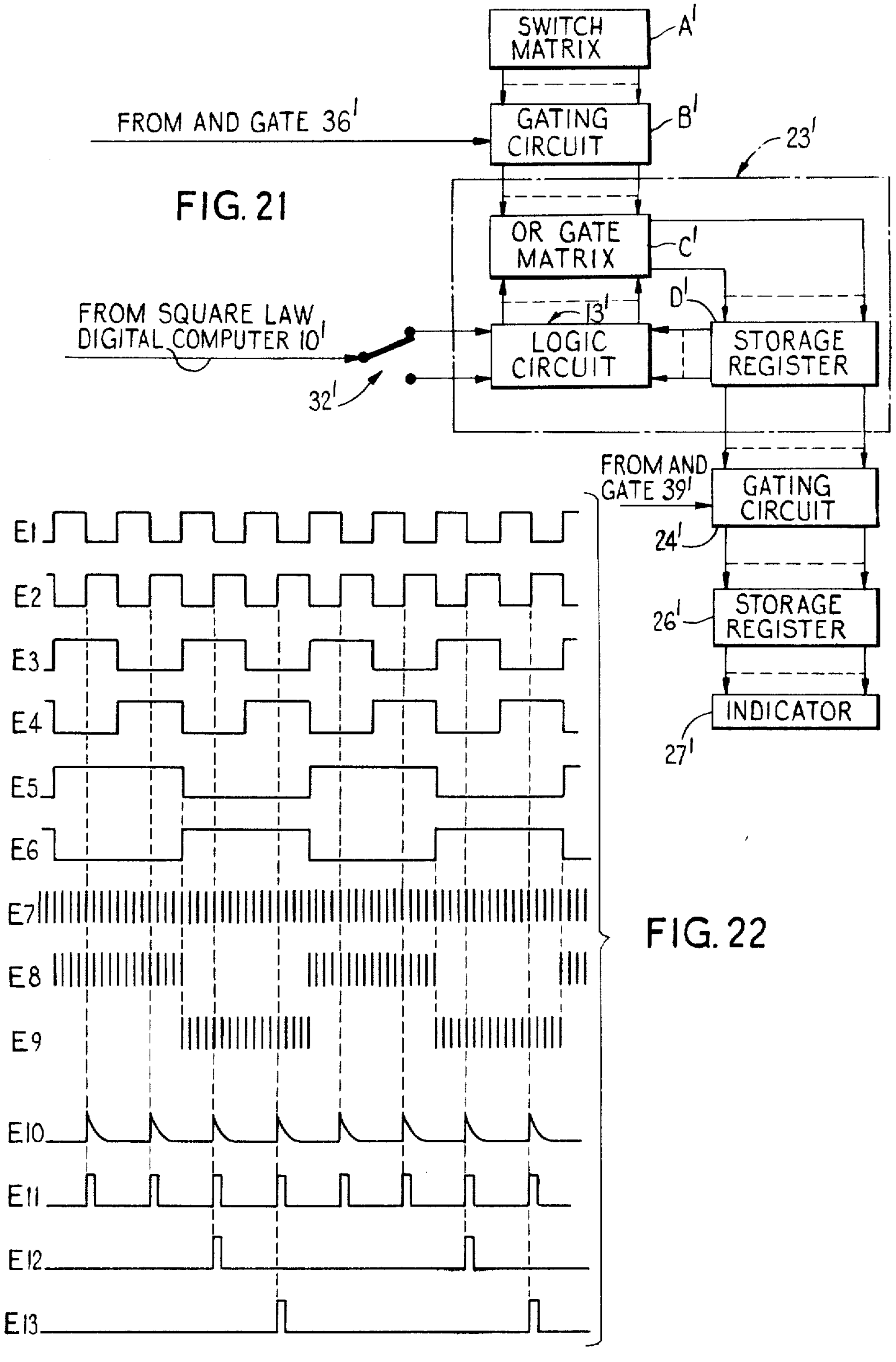
FIG. 21 is a block diagram of a conventional off-set digital computer.
FIG. 22 is a graph of a group of waveforms characteristic of the operation of the digital function generator shown in FIG. 20.

A rate multiplier 38' is connected from NAND gate 343 and produces on its output lead 358 a number of serial pulses in a group which is a fraction of the total input pulses in a group such as a group shown at E8 in FIG. 21 dependent upon the number stored in the register of the counter of divider 37'. The output pulses in a group on output lead 358 of rate multiplier 38' is then directly proportional to the square of the period of the square wave either at junction 335 in FIG. 14 or at input lead 341 therein.

In FIG. 15, a switch matrix 33' is connected to a rate multiplier 359. Rate multiplier 359 is also connected from rate multiplier output lead 358 to off-set digital computer 354. Rate multiplier 359, thus, has an output lead 360 which produces groups of pulses directly proportional to or equal to $AT^2$. Switch matrix 33' has a set of manual operators 361 to produce binary or decimal switch settings. Binary switches may be employed. Alternatively, binary coded decimal (BCD) switches may be employed. The factor A is set by setting the switch matrix 33'. The number of pulses in a group on the output lead 360 of rate multiplier 359 is less than the input thereto, in part, depending upon the setting of the switch matrix 33'.

In FIG. 15, the counter of divider 37' may be entirely conventional. As stated previously, switch matrix 33' may also be entirely conventional. The same is true of rate multipliers 38' and 359.

Figure 16:
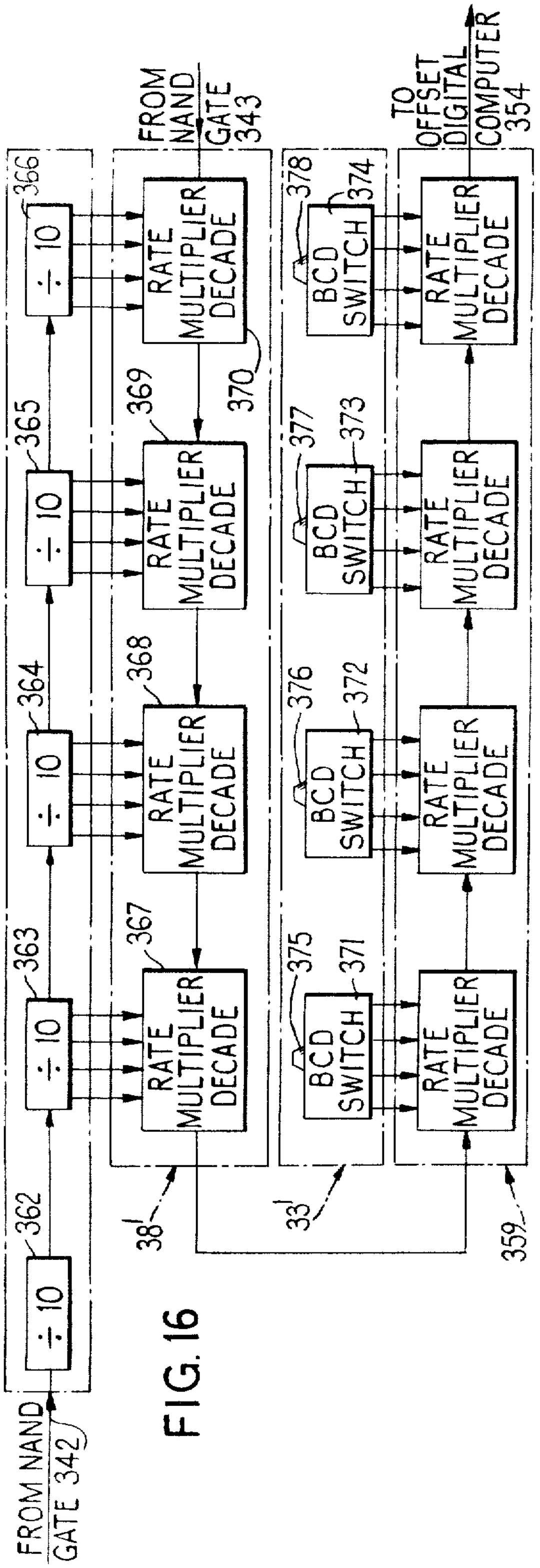
FIG. 16 is a still more detailed block diagram of a divider and rate multiplier shown in FIG. 15.

In accordance with one alternative embodiment of the present invention, divider 37', rate multiplier 38', switch matrix 33' and rate multiplier 359 may be as shown in FIG. 16. Divider 37' includes divide-by-ten dividers 362, 363, 364, 365 and 366. Rate multiplier 38' has rate multiplier decades 367, 368, 369 and 370, respectively, connected from BCD outputs of divide-by-10 dividers 363, 364, 365 and 366, respectively.

Note that divide-by-10 divider 366 carries the most significant decimal digit. Rate multiplier decade 370, on the other hand, has the highest frequency output. Thus, in order to produce the desired multiplication of the decimal number contained in the registers 363–366, as a fraction, i.e. less than unity, it is necessary to weigh divider 366 against the highest frequency rate multiplier decade 370 and so forth.

Switch matrix 33' contains four BCD switches 371, 372, 373 and 374 having adjustable knobs 375, 376, 377 and 378, respectively.

Rate multiplier 359 is identical to rate multiplier 38' and, therefore, will not be described further. From the foregoing, it will be appreciated that BCD switch 371 carries the most significant digit.

Typically, the square wave appearing at junction 335 in FIG. 14 has a period of 0.5 second. Typically, the pulse repetition frequency of the output signal of burst oscillator 345 in FIG. 14 is 100 kilohertz. Further, typically, the number of pulses in each of the groups at E8 and E9 in FIG. 21 are about 25,000.

Divide-by-10 divider 362 is employed in divider 37' to make sure that the number of pulses impressed upon rate multiplier 38' by NAND gate 343 is about ten times the number stored in divide-by-10 dividers 363–366.

Display unit 355 shown in FIG. 14 is entirely conventional, and for each decimal digit, it may appear as in FIG. 17. Display unit 355 is, thus, sold with logic circuit 358 to illuminate neon lamps 379 of the indicator 357. Such display units are sold by many companies. For example, one such display unit is sold by the Burroughs Corporation under the trademark PLANAPLEX.

Rate multipliers 38' and 359 may be entirely conventional. Any one including, but not limited to, those sold by Motorola Semi-conductor Products, Inc. and Texas Instruments Incorporated may be employed. The Motorola model numbers are MC 14527AL and Mc 14527CL. The Texas Instruments rate multipliers are described as synchronous rate multipliers with circuit types SN7497 and SN74167. The foregoing Motorola and Texas Instruments model numbers are generally given for what is described herein as a "rate multiplier decade" which may be connected seriatim ad infinitum, if desired.

As stated previously, off-set digital computers 354 shown in FIG. 15 may be entirely conventional. One or many such computers may be employed. One such computer is sold as an MOS by Hughes Aircraft Company. This MOS is described further as a counter/latch/decoder/driver HCTRO107D/HCTRO107F.

Figure 18:
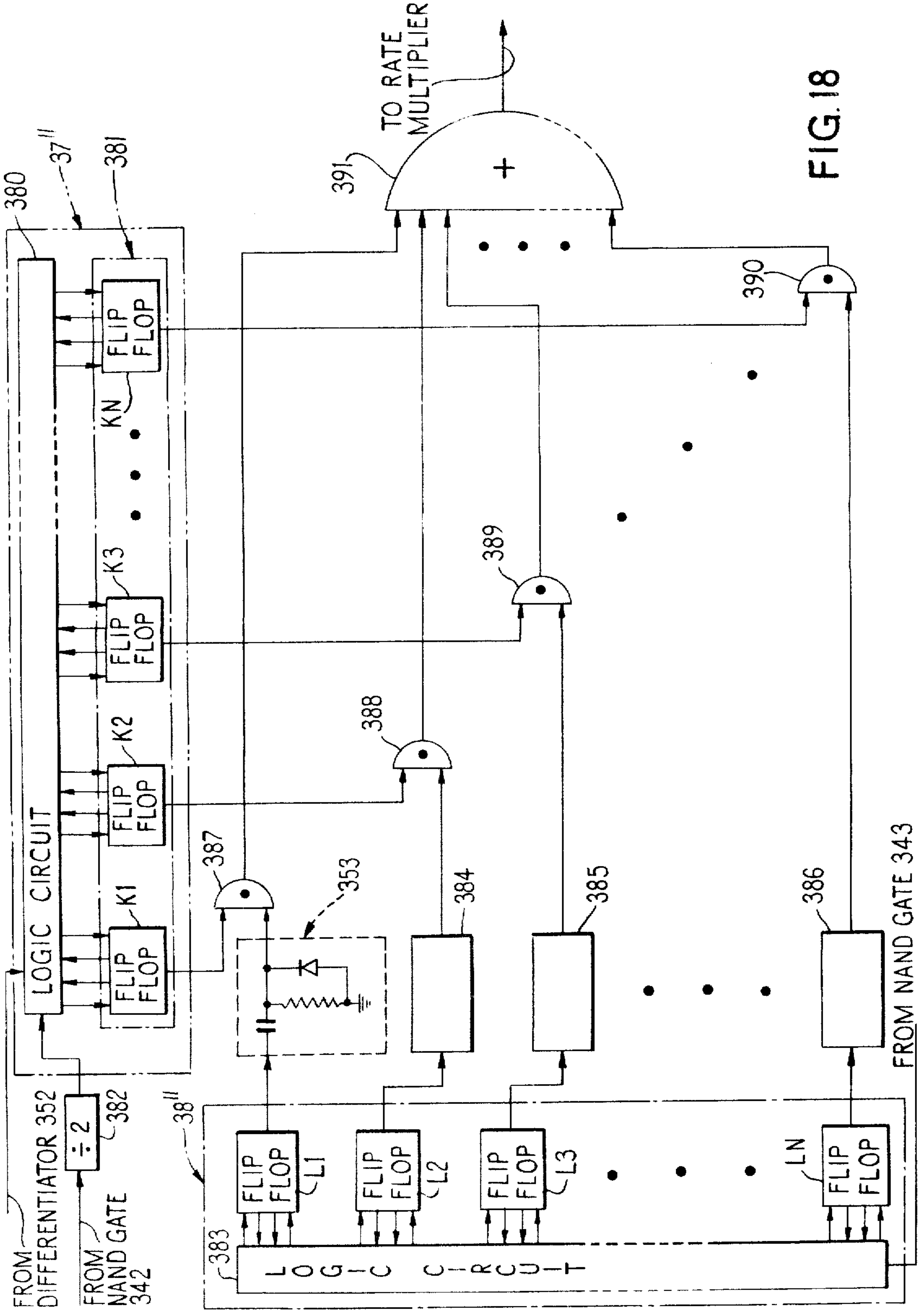
FIG. 18 is a block diagram of alternative embodiments of a divider and rate multiplier shown in FIG. 15.

Alternatively, divider 37' and rate multiplier 38' of FIG. 15 may be combined in a changed form as shown in FIG. 18. Counters are provided at 37'' and 38''. Counter 37'' has a conventional logic circuit 380 and flip-flops K1, K2, K3 . . . KN forming a register 381. Differentiator 352 is connected to logic circuit 380. NAND gate 342 is connected to logic circuit 380 through a divide-by-two divider 382.

Counter 38'' has a logic circuit 383 and flip-flops L1, L2, L3 . . . LN connected therefrom to differentiators 353, 384, 385 . . . 386, respectively.

AND gates 387, 388, 389 . . . 390 are respectively connected from differentiators 353, 384, 385 . . . 386, and respectively from flip-flops K1, K2, K3 . . . KN.

The output of each AND gate shown in FIG. 18 is connected to the respective input of an OR gate 391, the output of which is impressed upon rate multiplier 359 shown in FIG. 15.

Note that flip-flop KN contains the most significant digit and the output frequency of flip-flop LN is the greatest, the output of differentiator 386 being impressed in common with the 1 output of flip-flop KN on the two respective inputs of AND gate 390.

The outputs shown from all the flip-flops in register 381 and from the flip-flops L1, L2, L3 . . . LN in counter 38'' are from the 1 outputs of the corresponding flip-flops.

The differentiators shown in FIG. 18 produce positive output pulses when the 1 output of the corresponding flip-flop goes high.

As stated previously, the flip-flops of register 381 in counter 37'' are weighted in binary fashion according to the frequency of the output pulses of the differentiators. None of the pulses at the outputs of the AND gates in FIG. 18 are coincident. This feature and the method of operation of all the structures shown in FIG. 18 is fully explained in application A9.

Counter 38'' and logic circuit 383 receive an input from NAND gate 343 shown in FIG. 14, and as shown in FIG. 18.

Figure 19:
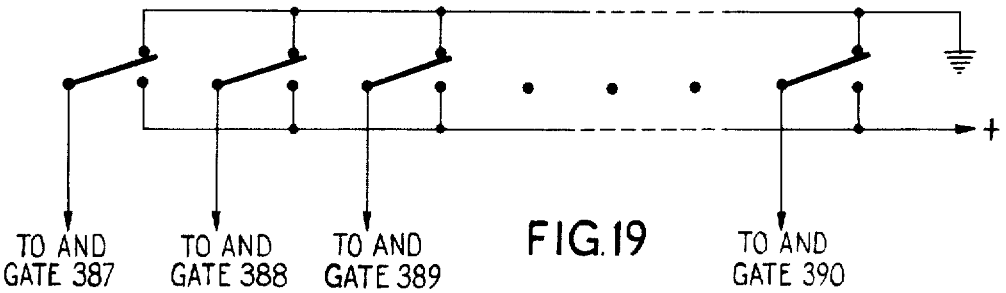
FIG. 19 is a switch matrix which may be employed with a counter shown in FIG. 18 to produce serial pulses in serial groups where the number of pulses in a group is directly proportional to the binary setting of the switches in the matrix of FIG. 19.

If desired, the square law digital computer 344 shown in FIGS. 14 and 15 may be further modified by changing rate multiplier 359 to that shown in FIG. 18, but by omitting counter 37'' and substituting therefor a switch matrix 392 as shown in FIG. 19.

Figure 20:
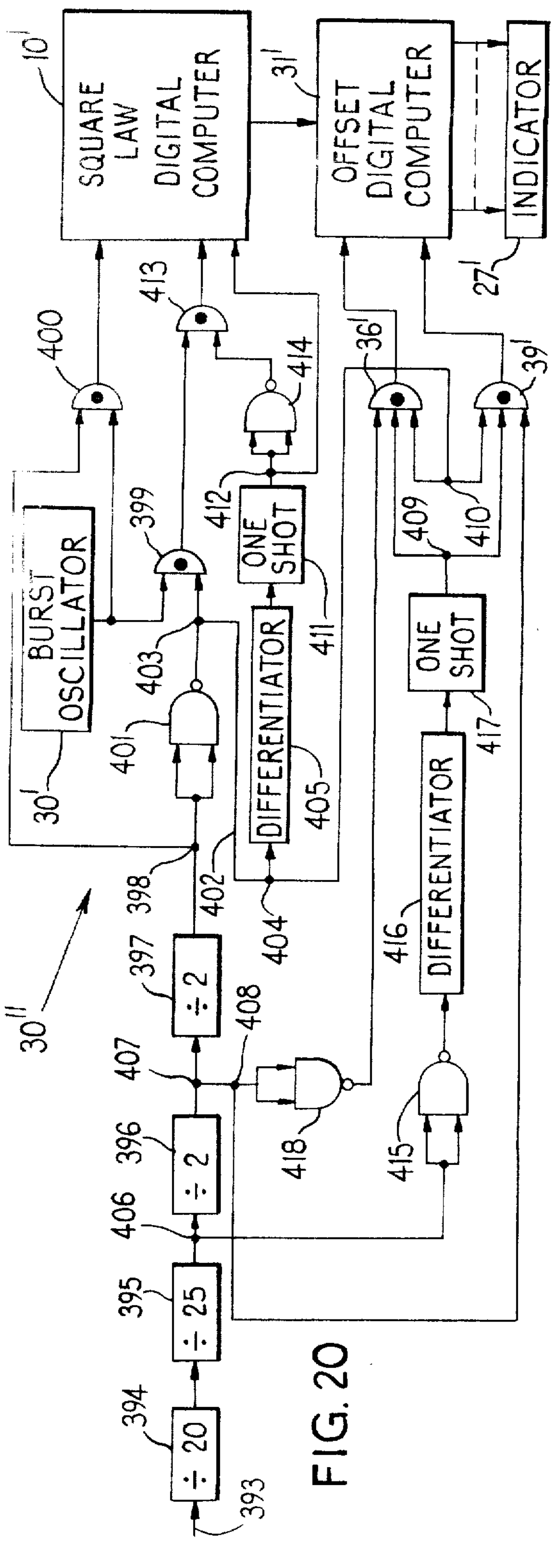
FIG. 20 is a block diagram of an alternative embodiment of the digital function generator shown in FIG. 1.

An alternative embodiment of digital function generator 30 is indicated at 30'' in FIG. 20. Digital function generator 30'' has an input lead 393. A divide-by-20 divider 394, a divide-by-25 divider 395, a divide-by-two divider 396 and a divide-by-two divider 397 are connected in succession from input lead 393 to a terminal junction 398 corresponding to terminal junction 335 in FIG. 14.

Digital function generator 30'' has a burst oscillator 30' which may be identical to burst oscillator 345 shown in FIG. 14. AND gates are provided at 399 and 400 with their outputs connected respectively at the points indicated in divider 37' and rate multiplier 38' of square law digital computer 10' shown in FIGS. 15 and 20, dividers 37' and 38' being the same in both the cases of FIGS. 14 and 20. For example, the output of gate 399 is connected to the input of rate multiplier 37' and the output of AND gate 400 is connected to the input of rate multiplier 38' shown in FIGS. 15 and 20.

In accordance with the foregoing, square law digital computer 10' in FIG. 20 may be identical to square law digital computer 344 shown in FIG. 14.

AND gate 400 recieves one input from junction 398 and another input from oscillator 30'. AND gate 399 receives one input from the output of burst oscillator 30', and another input from the output of an inverter 401 connected from junction 398. A lead 402 connects a junction 403 with a junction 404. The output of inverter 401 is connected to junction 403. One input of AND gate 399 is connected from junction 403.

As before, a differentiator 405 is connected from junction 404 to the divider 37' in square law digital computer 10' to reset the same, as before.

Digital function generator 30'' shown in FIG. 20 has various other junctions 406, 407, 408, 409 and 410.

Differentiator 405 is connected to divider 37' of square law digital computer 10' through a one-shot 411. The output of one-shot 411 is connected to a junction 412. Junction 412 is connected to square law digital computer 10'. The output of AND gate 399 is connected to square law digital computer 10' through an AND gate 413 having a second input from an inverter 414 connected from junction 412.

An inverter 415, a differentiator 416 and a one-shot 417 are connected in succession in that order from junction 406 to junction 409. AND gates 36' and 39' are provided, each of which receives an input from the output of one-shot 417 by a respective connection from junction 409. Junction 406 is connected from the output of divider 395 and to the input of divider 396. Junction 407 is connected from the output of divider 396 and to the input of divider 397. Junctions 407 and 408 are connected together. AND gate 39' has one input connected from junction 408.

Junctions 404 and 410 are connected together. AND gates 36' and 39' both receive an input from the output of inverter 401 by respective connections from junction 410. An inverter 418 is connected from junction 408 to another input of AND gate 36'.

Off-set digital computer 31' receives an input from square law digital computer 10' and from the outputs of AND gates 36' and 39'.

An indicator 27' is connected from the output of off-set digital computer 31'. Off-set digital computer 31' may be decimal or binary. The indicator 27' may be a simple indicator with one lamp for each binary stage or a decimal indicator as described hereinbefore and hereinafter. Indicator 27' may be entirely conventional. Off-set digital computer 31' may be conventional or of the type illustrated in FIG. 22 and disclosed, described and illustrated in application A8.

Off-set computer 31' in FIG. 20 produces a binary or a binary coded decimal (BCD) output so that indicator 27' may be read directly, binary or decimal, in density or specific gravity $d$, where $$d = KAT^2 + B$$

and $$K = \frac{f_o^2}{4C}$$

where,

- $f_o$ is the pulse repetition frequency of burst oscillator 30',
- $C = 10^n$ (although C need not be a multiple of 10) where $n$ is a positive integer large enough to make $K_o$ less than unity,
- $A$ is a constant less than unity determined by the setting of switch matrix 33' in FIG. 15,
- $B$ is a positive integer determined by the setting of switch matrix 33' in FIG. 15 or the switch matrix A' shown in FIG. 21.
- $T$ is the period of square wave E5 in FIG. 21.

$$K_o = \frac{f_o T_m}{C}$$

- $T_m$ is the maximum expected value of T over the operating range of the instrument.
- For $f_o$ = 100 kilohertz and 00.1 second $\leq T_m < 1.0$ second, $C$ is, thus, 100,000 to make $K_o = 0.5$. Thus, K may be 25,000. This gives:

$$d = 25{,}000\ AT^2 + B$$

Either $A$ or $B$ may be positive or negative. The position of a switch 32' in FIG. 22 determines whether a counter counts up ($A$ and $B$ algebraic signs the same) or down ($A$ and $B$ algebraic signs different).

The pulses in each grouping at E8 go to rate multiplier 38' in FIG. 15. The pulses in each group E9 go to divider 37' in FIG. 15. The output of rate multiplier 38' is, therefore, equal to $KAT^2$.

The constants $A$ and $B$ may be determined empirically by placing the densitometer probe 34' in two different fluids of two different known densities each time measuring $T$. The constants $A$ and $B$ may then be calculated from two simultaneous equations per patent P1.

Something about certain structures disclosed herein is discussed in the material immediately following. The importance of some of this discussion may be apparent only from subsequent explanations.

A main storage register D' is illustrated in FIG. 21. As will be described, a predetermined number B is entered in storage register D' periodically.

A logic circuit is provided at 13'. Logic circuit 13' has an input from square law computer 10' through switch 32'.

In FIG. 2, the said predetermined number B is periodically entered in storage register D, as stated previously. The magnitude of the predetermined number B may be selected or changed by operating binary or binary coded decimal (BCD) switches, to be described, which are located in a switch matrix A'. The switches in matrix A' are either connected from a positive potential V1 or ground. The outputs of the switches are sampled and impressed upon storage register D' periodically. A gating pulse (E13 in FIG. 21) is impressed upon a gating circuit B' for this purpose.

Gating circuit B' is connected from matrix A' to an OR gate matrix C'. The output of OR gate matrix C' is then impressed upon storage register D'.

Once the said predetermined number B has been entered into storage register D', logic circuit 13' then controls the register D' to count up or down depending upon whether the signs of A and B are the same or different, switch 32' in FIG. 22 being placed in the one or the other corresponding positions thereof, respectively, on this account. The output of logic circuit 13' is, thus, impressed upon storage register D' through OR gate matrix C'. Logic circuit 13' receives pulses to count from switch 32'. Logic circuit 13' receives other inputs from storage register D'.

From the foregoing, it will be appreciated that matrix C' with logic circuit 13' and storage register D' from either a count up-count down counter depending upon in which position switch 32' lies. This counter may be entirely conventional, if desired. The counter is indicated at 23'.

The output of storage register D' is also sampled periodically by a gating circuit 24' which may be of the same type as gating circuit B'. Gating circuit 24' receives pulses from AND gate 39' in FIG. 20 to cause it to sample the output of register D'. The output of gating circuit 24' is impressed upon a storage register 26'. The output of the storage register 26' is impressed upon indicator 27'.

If desired, indicator 27 may be a binary indicator or a BCD indicator.

All of the structures D', 13', A', B', C', 24', 26' and 27' may be entirely conventional or may or may not be identical to the corresponding structures disclosed in application A8.

Alternatively, indicator 27' may simply be a row of lamps each connected from the 1 output of each of the flip-flops in storage register 26'.

Pulses are supplied from AND gate 36' to gating circuit B'.

The purpose of the switch matrix A' is to set, periodically, the flip-flops in storage register D' to selected states.

Switch matrix A' may have one double-pole, double-throw switch for each bit or flip-flop in register D'. Gating circuit B may have an AND gate for the set 1 and set 0 inputs to each bit or flip-flop in register D'. The OR gate matrix C' may have an OR gate for the set 1 and set 0 inputs of each bit in register D'.

The same outputs of the bits of register D' are connected both to logic circuit 13' and to gating circuit 24'.

The square wave at junction 406 in FIG. 20 is illustrated at E1 in FIG. 22.

The square wave which appears at the output of inverter 415 in FIG. 20 is illustrated at E2 in FIG. 22.

The square wave which appears at junction 407 in FIG. 20 is illustrated at E3 in FIG. 22.

The square wave which appears at the output of inverter 418 in FIG. 20 is illustrated at E4 in FIG. 22.

The square wave which appears at the terminal junction 398 in FIG. 20 is illustrated at E5 in FIG. 22.

The square wave which appears at junction 403 in FIG. 20 is illustrated at E6 in FIG. 22.

The output of burst oscillator 30' is illustrated at E7 in FIG. 22.

The output of AND gate 400 in FIG. 20 is illustrated at E8 in FIG. 22. The output of AND gate 399 in FIG. 20 is illustrated at E9 in FIG. 22.

The output of differentiator 416 in FIG. 20 is illustrated at E10 in FIG. 22.

The output of one-shot 417 shown in FIG. 20 is illustrated at E11 in FIG. 22.

The output of AND gate 39' shown in FIG. 20 is illustrated at E12 in FIG. 22.

The output of AND gate 36' shown in FIG. 20 is illustrated at E13 in FIG. 22.

The phrase "utilization means," as used herein and in the claims, is hereby defined to include, but not be limited to, an indicator, a process controller, or otherwise.

Although a symbol has been used consistently in the drawings to represent OR gates, it is to be understood that the symbol includes, but is not limited to, a wire OR gate. Thus, one or more or all of the symbols employed herein to represent an OR gate may or may not be a wire OR gate, as desired.

The phrase "OR gate," as used herein and in the claims, is hereby defined to include a NOR gate with or without an inverter, as may be necessary or desirable.

All of the said patents P1, P2, P3 and P4 are hereby incorporated herein by this reference hereto as though fully set forth herein hereat.

All of the said applications A1, A2, A3, A4, A5, A6, A7, A8, A9 and A10 are, by this reference hereto, hereby incorporated herein as though fully set forth herein hereat.

As stated previously, driver amplifier 48 shown in FIG. 2 may be conventional or of a type disclosed in application A3.

In a sense, the amplifier of input circuit 36 shown in FIG. 2 also operates as a limiter.

AGC amplifier 37 shown in FIG. 2 also acts as an analog adder as well as an AGC amplifier.

In FIG. 1, digital function generator 30, having input lead 35, may have the said input lead 35 connected from lopp circuit output lead 33 or from any other appropriate conductor in loop circuit 29, or from junction 77 as shown in FIG. 2.

Phase lock loops are conventional. Most of phase lock loop 43 may be conventional. All of phase lock loop 47 may be conventional, all of the other structures illustrated in FIG. 2 being conventional. However, note will be taken that phase lock loop 43 receives a pulse input from output lead 75 of clamp 42 when the said output lead 75 thereof is not grounded by threshold detector 54. On the other hand, VCO 216 shown in FIG. 4 and VCO 245 shown in FIG. 6 may produce any combinations of output signals, viz. sawtooth waves, sine waves and/or square waves. All of this is prior art. For ease of understanding, the outputs of VCO's 216 and 245 may be assumed to be sine waves.

In FIGS. 4 and 6, phase detectors 212 and 243, respectively, may be conventional phase detectors or four quadrant analog multipliers. Such phase detectors easily produce a phase sensitive output signal. For example, see application A5.

Low pass filter 244 shown in FIG. 7 may also be considered to be an integrator, if desired.

All of the low pass filters disclosed herein may or may not include amplifiers, as desired. Amplifiers may be inserted anywhere in all of the circuitry disclosed herein.

The phrase "AND gate", as used herein and in the claims, is hereby defined to include a NAND gate with or without an invertor.

The phrase "NAND gate," as used herein and in the claims, is hereby defined to include an AND gate with or without an inverter.

Under some circumstances, NAND gates 342 and 243 shown in FIG. 14 may be AND gates, if desired.

As indicated hereinbefore, binary or binary decimal systems may sometimes be used entirely in part, not at all, as shown or to a greater or less extent than that disclosed.

In FIG. 20, the input to AND gate 413 from inverter 414 suppresses the output of AND gate 413 during reset. In some cases, this circuitry may be omitted.

The phrase "means to impress a signal," as used herein and in the claims, is hereby defined to include, but not be limited to, a conductive lead or otherwise.

The phrase "means connecting," as used herein and in the claims, is hereby defined to include, but not be limited to, a conductive lead, a rate multiplier, an input circuit, an AGC amplifier, or other means, a subcombination, a circuit component, or otherwise.

The word "continuous," as used herein and in the claims, is hereby defined to include, but not be limited to, a register updated periodically.

The word "densitometer," as used herein and in the claims, is hereby defined to include, but not be limited to, that shown with or without (1) utilization means, (2) a process controller, (3) a density or specific gravity indicator, or (4) otherwise.

All the zero crossing detectors disclosed herein may be squares, if desired.

The phrase "specific gravity," as used herein and in the claims, is hereby defined as the ratio of the density of a sample fluid to the density of a reference fluid, the reference fluid being water or air or any other fluid.

All of the clamps disclosed herein may be omitted and gates used in lieu thereof.

What is claimed is:

1. Apparatus for producing a sine wave signal manually adjustable in phase, said apparatus comprising: a phase adjustment circuit having input and output leads; first means having an output lead connected to said circuit input lead and actuable to produce a saw-tooth signal having ramps, said first means being actuable to impress said saw-tooth signal repeatedly at a predetermined fundamental frequency on said circuit input lead, the rate of change of the magnitude of said signal with respect to time being constant during actuating portions of said signal during which said ramps are generated, said circuit including adjustment means to cause a pulse to be impressed upon said circuit output lead each time the magnitude of said ramp becomes equal to a predetermined magnitude, said predetermined magnitude being adjustable with said adjustment means; a phase lock loop having input and output leads; and second means connecting said circuit output lead to said phase lock loop input lead, said phase lock loop producing a sine wave signal on said output lead thereof of said predetermined fundamental frequency and of a phase adjustable in accordance with the adjustment of said adjustment means.

2. The invention as defined in claim 1, wherein said saw-tooth signal is a saw-tooth voltage, said pulse being a voltage pulse, said sine wave signal being a sine wave voltage.

3. The invention as defined in claim 2, wherein said phase adjustment circuit includes first and second voltage dividers each having an intermediate tap, a potentiometer having a winding with first and second ends, and a wiper, first and second differential amplifiers each having inverting and non-inverting inputs, and an output, said wiper being connected to the inverting input of said first amplifier, the tap of said first divider being connected to the non-inverting input of said first amplifier, a resistor having one end connected from the output of said first amplifier, said second amplifier output being connected to said first amplifier output, the inverting input of said second amplifier being connected from said second divider tap, a square wave voltage source having an output lead and impressing a square wave on said second amplifier non-inverting input of said predetermined frequency and in phase with said saw-tooth voltage, said first means impressing said saw-tooth voltage on said first divider tap.

4. The invention as defined in claim 3, wherein means are provided to maintain the opposite ends of each of said dividers and the opposite ends of said potentiometer at two different respective D.C. potentials, means to maintain the other end of said resistor at a potential different from one of said two potentials, a capacitor being connected from the output lead of said first means to said first divider tap.

* * * * *